United States Patent
Villa et al.

(10) Patent No.: US 10,679,137 B2
(45) Date of Patent: Jun. 9, 2020

(54) SYSTEMS AND METHODS FOR DETERMINING REAL-TIME VISITOR SEGMENTS

(71) Applicant: Adobe Inc., San Jose, CA (US)

(72) Inventors: Natalee Villa, Salt Lake City, UT (US); Scott Pead, Mapleton, UT (US); James Nyland, Highland, UT (US); Craig Mathis, American Fork, UT (US)

(73) Assignee: Adobe Inc., San Jose, CA (US)

(*) Notice: Subject to any disclaimer, the term of this patent is extended or adjusted under 35 U.S.C. 154(b) by 763 days.

(21) Appl. No.: 14/986,811

(22) Filed: Jan. 4, 2016

(65) Prior Publication Data
US 2017/0193382 A1 Jul. 6, 2017

(51) Int. Cl.
*G06N 7/00* (2006.01)
*G06F 16/22* (2019.01)
*G06F 16/2458* (2019.01)

(52) U.S. Cl.
CPC ......... *G06N 7/005* (2013.01); *G06F 16/2228* (2019.01); *G06F 16/2477* (2019.01)

(58) Field of Classification Search
CPC .............. G06N 7/005; G06F 17/30321; G06F 17/30551; G06F 15/173; G06F 16/2228; G06F 16/2477; G06Q 30/00
See application file for complete search history.

(56) References Cited

U.S. PATENT DOCUMENTS

| | | | | |
|---|---|---|---|---|
| 9,521,205 B1* | 12/2016 | Liao | .................... | H04L 67/22 |
| 10,091,312 B1* | 10/2018 | Khanwalkar | ........... | H04L 67/22 |
| 2014/0019488 A1* | 1/2014 | Wo | ....................... | G06F 21/6218 |
| | | | | 707/784 |
| 2014/0089043 A1* | 3/2014 | Weinstein | .............. | G06Q 30/02 |
| | | | | 705/7.29 |

OTHER PUBLICATIONS

Ediger et al., "Massive Streaming Data Analytics: A Case Study with Clustering Coefficients", Apr. 19-23, 2010, 2010 IEEE International Symposium on Parallel & Distributed Processing, Workshops and Phd Forum (IPDPSW), pp. 1-8 (Year: 2010).*

* cited by examiner

*Primary Examiner* — Kamran Afshar
*Assistant Examiner* — Brent Johnston Hoover
(74) *Attorney, Agent, or Firm* — Kilpatrick Townsend & Stockton LLP

(57) ABSTRACT

Systems and methods disclosed herein compactly store representations of segment-specific interaction data from a real time data stream of data interactions by multiple entities to facilitate segment-specific analytics for particular time periods. Segment rules defining characteristics of entities within a segment are received. A first probabilistic data structure is created representing unique entity IDs included in instances of interaction data in the real time data stream during a first time period. A second probabilistic data structure representing unique entity IDs included in instances of interaction data in the real time data stream during a second time period different from the first time period. The first probabilistic data structure represents only entity IDs of entities within the segment and the second probabilistic data structure represents only entity IDs of entities within the segment. The first and second probabilistic data structures are indexed and stored.

20 Claims, 5 Drawing Sheets

|       | Minute | Metric              | Summary Object   |
|-------|--------|---------------------|------------------|
| 340 → | 1      | Active Visitors     | 500              |
|       | 1      | Visitor Segment S1  | 265              |
|       | 1      | Mobile Device Sketch| iOS 7, Android 8 |
|       | ...    |                     |                  |
| 350 → | 5      | Active Visitors     | 465              |
|       | 5      | Visitor Segment S1  | 302              |
|       | 5      | Mobile Device Sketch| iOS 7, Android 8 |
|       | ...    |                     |                  |
| 360 → | 17     | Active Visitors     | 515              |
|       | 17     | Visitor Segment S1  | 276              |
|       | 17     | Mobile Device Sketch| iOS 7, Android 8 |
|       | ...    |                     |                  |

FIG. 3

SYSTEMS AND METHODS FOR DETERMINING REAL-TIME VISITOR SEGMENTS

TECHNICAL FIELD

This disclosure relates generally to computer-implemented methods and systems and more particularly relates to real-time visitor segments.

BACKGROUND

The increasing number of devices connected to the Internet has led to an ever increasing amount of data associated with the devices and users of the devices. It is desirable to obtain real-time data about such devices and users and store such data for later analysis. Current data analytics tools can count users and devices in real-time. With the increasing number of users and devices, the ability to count and the store data related to the large number of users and devices has become increasingly expensive, both computationally and economically. Additionally, current tools do not allow granular flexibility to compute separately multiple different segments of users and devices and store and index those segments. For example, it has become increasing difficult to not only keep track of the number of individual users of a website, but also to keep track of the different devices that a user accesses the website from and of a particular user's habits while on the website on each device. In this example, current analytics tools provide a website owner with various counts, such as number of people visiting the website and number of people purchasing goods from the website. However, these current analytics tools lack the ability to provide more specific information about users and devices and require the website owner to make a number of inferences regarding the meaning of the data counts.

SUMMARY

Systems and methods disclosed herein generate probabilistic data structures during multiple time periods representing unique entity IDs within a defined segment. The segment can be defined by segment rules defining characteristics of entities within the segment. Entity IDs associated with a segment are identified from a real time data stream of interactions associated with entity IDs. Probabilistic data structures are created representing the unique entity IDs associated with a segment. The real time data stream can be augmented to include additional information associated with entity IDs. Multiple probabilistic data structures for multiple segments can be created in parallel during a time period. The probabilistic data structures are indexed and stored to facilitate counting unique entity IDs within a segment during time periods.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

FIG. 3 is an exemplary index of probabilistic data structures.

DETAILED DESCRIPTION

Figure 1:
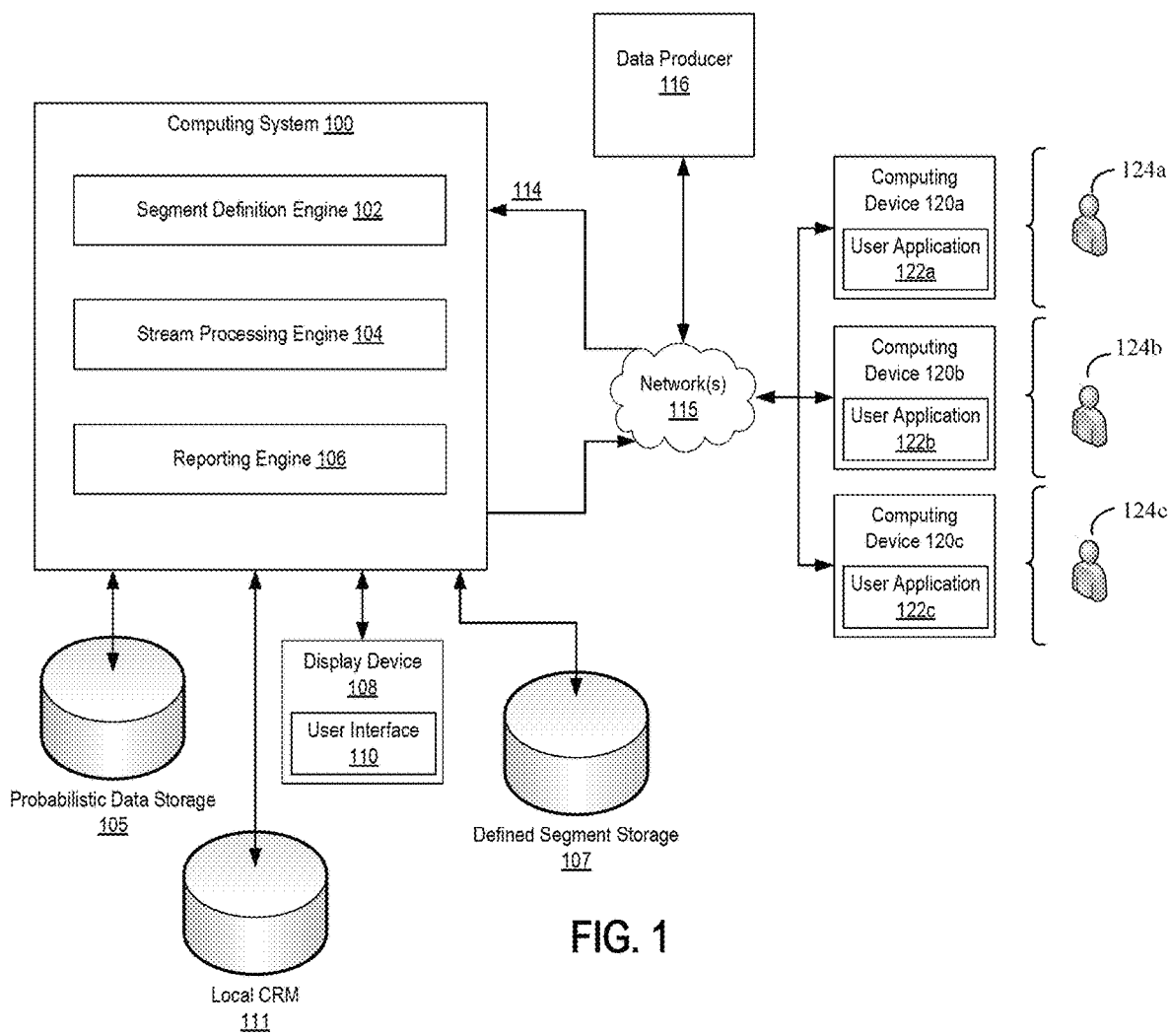
FIG. 1 is a block diagram depicting an example of a system for tracking interaction data received from computing devices used by tracked entities and determining, indexing and storing segments of tracked entities

Computer-implemented systems and methods disclosed herein generate and store representations of unique entities in a segment at time intervals from a real-time data stream using probabilistic data structures. The real-time data stream contains entity IDs and interaction data associated with entities, such as users or devices. Rather than needing to store all interaction data from the data stream for later use in analyzing segments, segment specific data is analyzed in real-time and interaction data unrelated to the segment does not need to be stored. Moreover, storing the segment-specific data in probabilistic data structures is an efficient way to store non-duplicative information. A tracking entity can use the representations stored in the probabilistic data structures to count the number of unique entity IDs in a segment during time intervals.

For example, a user associated with a tracking entity first defines segments through the setting of segment rules, which define the characteristics of the entities within the defined segment. In one example, segment rules define a segment of active visitors to a website (i.e., tracked entities). In another example, segment rules define a segment of users of network connected washing machines (i.e., tracked entities). In a further example, segment rules define a segment of mobile phones used to interact with a website (i.e., tracked entities). Segment rules can be defined via a web browser user interface. Some segments are designated as real time, and others are not real-time depending on the temporal window of evaluation.

A real time data stream associated with tracked entities is processed in real time by an analytics system. The real time data stream comes from a data producer, such as, for example, a website, an app, a set top box, or any network connected device. The data stream is a continual stream or other series of time stamped records sent with a unique entity ID per entity (user ID, cookie ID, hardware ID, etc.) along with data interactions that occurred (page view, button click, etc.) and known attributes at time of interaction (browser type, product ID, logged in, app version, etc.). Thus, the data stream includes entity IDs and interaction data associated with the entity IDs. For example, the data stream can include website user IDs for visitors on the website and identification of the webpages being viewed by the visitors. The analytics system receives segment rules and any updates to the segment rules for a segment and applies the segment rules to the real-time data stream to determine the entity IDs associated with the segment. For example, if the segment rules define a segment as active users on a website, the analytics system analyses the incoming data stream and identifies the user IDs associated with active users on the website during a predetermined time interval, such as one second or one minute. In this manner, the analytics system determines each second or minute (depending on the set time interval) the user IDs associated with active users on the website.

The analytics system uses probabilistic algorithms, such as HyperLogLog, Bloom filter, and Count-Min sketch, to create a probabilistic data structure to represent the unique entity IDs associated with the segment at each time interval. For example, if the time interval is one minute, during minute one the analytics engine processes all user IDs determined to be in the active website visitor segment with a probabilistic algorithm to create a probabilistic data structure representing the user IDs for active website visitors during minute one. Then at each subsequent minute, the analytics system creates a separate probabilistic data structure representing the users IDs for active website visitors during that minute. Probabilistic data structures are used to represent an estimate of unique entity IDs for a segment over the time interval, without having to store every entity ID. This representation is analyzed to determine a number of unique entity IDs for a segment over a time interval. The probabilistic algorithms (e.g., HyperLogLog) used to create the probabilistic data structures remove duplicates from the data structure. Probabilistic data structures are compact and in this embodiment are used to represent a large amount of information in a small amount of memory space.

Additionally, in one embodiment, certain dimensional fields associated with the tracked entity in the real-time data stream, like device operating system or geographical region, are stored in probabilistic data structures created by sparse approximation algorithms, such as Count-Min sketch. Such sparse approximation algorithms allow for counting information without having to store everything being counted.

The probabilistic data structure for each time interval and segment is stored in memory and is accessed, in one embodiment, via an HTTP streaming API. Each probabilistic data structure is further stored in a persistent storage, such as HBase, for use in historical reporting. A tracking entity is able to use the stored probabilistic data structures to analyze segments over time. For example, a tracking entity such as a retailer is able to get information about active website visitors over a period of time. Additionally, a tracking entity can develop reports based on a combination of probabilistic data structures associated with multiple segments.

Embodiments disclosed herein address problems unique to computer implemented segmenting of large amounts of real-time data. A network connected device, such as a server running a website, can receive millions of characteristics associated with millions of visitors each day. The increase in visitors and interactions with the website does not allow tracking entities to use conventional techniques to determine multiple segments of visitors during a time interval, such as one minute, and then store and index this segment information for later use. One aspect of this invention addresses such issues with conventional techniques for determining segments by using probabilistic data structures to estimate segment counts and store information for each segment using the segment rules.

As used herein, the term "tracking entity" is used to refer to organizations, individuals, and devices that track and collect data pertaining to traits and interactions (e.g., "characteristics" as defined below) of tracked entities. Examples of tracking entities include web analytics providers, advertisers, retailers, web marketers, financial institutions, equipment manufacturers, power companies and other entities interested in collecting information on end user and/or device behavior.

As used herein, the term "tracked entity" is used to refer to organizations, individuals, and devices that perform activities that are tracked by tracking entities. Such activities are performed on a network connected device, such as a computer, watch, valve, home appliance, or other device connected to a network, such as the internet.

As used herein, the term "characteristic" is used to refer to a feature or trait of an organization, individual, device or of an interaction performed by an organization, individual, or device that is collected or derived by a tracking entity. Examples of interaction data include (but are not limited to) user interactions that generated data; a user ID, a name, an address, an age or other demographic information, or other information about a user whose interactions generated the data; an internet protocol address of a device used to access a third-party website; a navigation history (clicks, hyperlink selections, etc.) of a browser used to access the third-party website; a purchase history of a user whose interactions generated the data; and the types of content (e.g., a video, an advertisement, etc.) presented by the third-party website and with which users interacted to generate the collected data; time of use and mode of use of a home appliance; a valve turned on or off.

As used herein, the term "segment" is used to refer to a list or group of individuals, devices, and other entities (tracked entities) that qualify for a set of rules defining a particular collection of one or more characteristics. The set of rules defining a particular collection of characteristics can be referred to as "segment rules." Thus, the collection of characteristics in a segment relate to a set of users or devices (tracked entities) who share common attributes. Examples of a segment include (but are not limited to) active visitors on a website or web page, devices used to access a website or web page, active visitors to a website that viewed a particular advertisement on a particular web page over a specified time range, active visitors on a website who viewed articles on a subject between a specified minimum amount of time and a specified maximum amount of time, and website visitors who purchased a particular product. Characteristics may be combined in a segment using any suitable combination of Boolean operators (AND, OR, or NOT). Data describing a segment is stored using any suitable storage object (e.g., a database of the various traits for the segment).

As used herein, the term "probabilistic data structures" is used to refer to a group of data structures that use functions, such as hash functions, to randomize and compactly represent a set of items, such as a segment. Each probabilistic data structure can be quickly analyzed to provide an approximate (not necessarily precise or certain) number of unique items represented by the data structure. For example, a probabilistic data structure representing the number of unique male visitors between age 18 and age 26 to a website last Friday was 1,456,987 with a probability of 99%. With probabilistic data structures, duplicates are generally not stored, and errors (i.e., uncertainty or imprecision) are controlled under a certain threshold. Examples of techniques for creating probabilistic data structures include, but are not limited to, a HyperLogLog, Bloom filter, and Count-Min sketch.

Referring now to the drawings, FIG. 1 is a block diagram depicting a computing environment in which a computing system 100 can track interaction data received from computing devices 120a-c used by tracked entities 124a-c. The computing system 100 includes features for configuring options specifying multiple segments of the tracked entities 124a-c and determining multiple segments over configured time periods.

The stream processing engine 104 of the computing system 100 receives a real time data stream 114 of data interactions as the tracked entities 124a-d interact with the data producer 116 via the computing devices 120a-c. The real time data stream includes a continual stream of time stamped records sent with a unique entity ID per entity (user ID, cookie ID, hardware ID, etc.) along with data interactions that occurred (page view, button click, etc.) and known attributes at time of interaction (browser type, product ID, logged in, app version, etc.). Data producer 116 provides applications, data, and other functions that are accessed by computing devices 120a-c via a network 115. The network 115 includes the internet and also includes local intranets or other suitable networks. Examples of the data producer 116 include, but are not limited to, social media websites, websites for purchasing products or services, customer facing websites for financial institutions, and apps on mobile devices. In another embodiment, data producer 116 includes services interacting with network connected devices, such as a set top box, home appliances, security systems, and network connected buildings. In some embodiments, the computing system 100 monitors multiple data producers and can include its own data producer (not shown) through the use of a web server, media server, or other content server and track tracked entity 124a-c interactions with the computing system 100 data producer.

The computing devices 120a-c execute respective user applications 122a-c that are used to access the data producer 116. Examples of the user applications 122a-c include, but are not limited to, web browsers for accessing websites provided by the data producers, applications specific to the data producers, applications on mobile devices, and applications controlling a set top box, home appliance, security system, or building.

The computing system 100 can augment the interaction data in the real time data stream with additional information from third parties, such as from a local CRM 111. The additional information can include profile information associated with the tracked entities 124a-c and computing devices 120a-c, such as meta data from the CRM 111, such as membership level, gender, demographics, etc. For example, the real time data stream 114 as received by the computing system 100 can include user IDs associated with each of the tracked entities 124a-c and website interaction data associated with each user ID. The real time can be further augmented to include the gender of the tracked entities 124a-c, the purchasing history of the tracked entities 124a-c, the geographic region associated with the computing device 120a-c, and the type of computing device 120a-c.

A tracking entity user interacts with the segment definition engine 102 via the user interface 110 on the display device 108 to define segment rules for segments. The segment rules define characteristics of entities within a segment. For example, segment rules can define all active users on a website or can define all male users over the age of 40 who have previously purchased good on a website. Additionally, segment rules can define specific devices or operating systems of computing devices accessing an data producer, such as a website. Moreover, segment rules can define characteristics of home appliance use or network connected building use. In one embodiment, segment rules are stored in defined segment storage 107 associated with the computing system 100.

The segment rules are used by the stream processing engine 104 to identify entity IDs in the data stream 114 that are within the defined segment. In one embodiment, the stream processing engine 104 uses a Spark Stream application to apply the segment rules to the data stream 114 and identify matching entity IDs and groups the matching entity IDs by time stamp. The stream processing engine 104 creates probabilistic data structures representing the entity IDs for a segment for a predetermined time period. The probabilistic data structures are created by processing the entity IDs of the segment by a probabilistic algorithm that reduces the size of the probabilistic data structure and removes duplicates. The resulting probabilistic data structure contains a representation of the entity IDs for the segment for the time period. The stream processing engine 104 repeatedly creates a probabilistic data structure for each time period for a particular segment. Additionally, probabilistic data structures for multiple segments can be created in parallel by the stream processing engine 104.

Each probabilistic data structure for each time period is indexed by the stream processing engine 104 and stored in probabilistic data storage 105. For example, the stream processing engine 104 can index the probabilistic data structures by the segment and time period they relate to. If multiple data structures are created for a segment during the same time period, such data structures can be combined into a single data structure of the time period prior to indexing and storing. The reporting engine 106 utilizes the probabilistic data structures to create reports and display the reports on the user interface 110 of the display device 108, for example.

Figure 2:
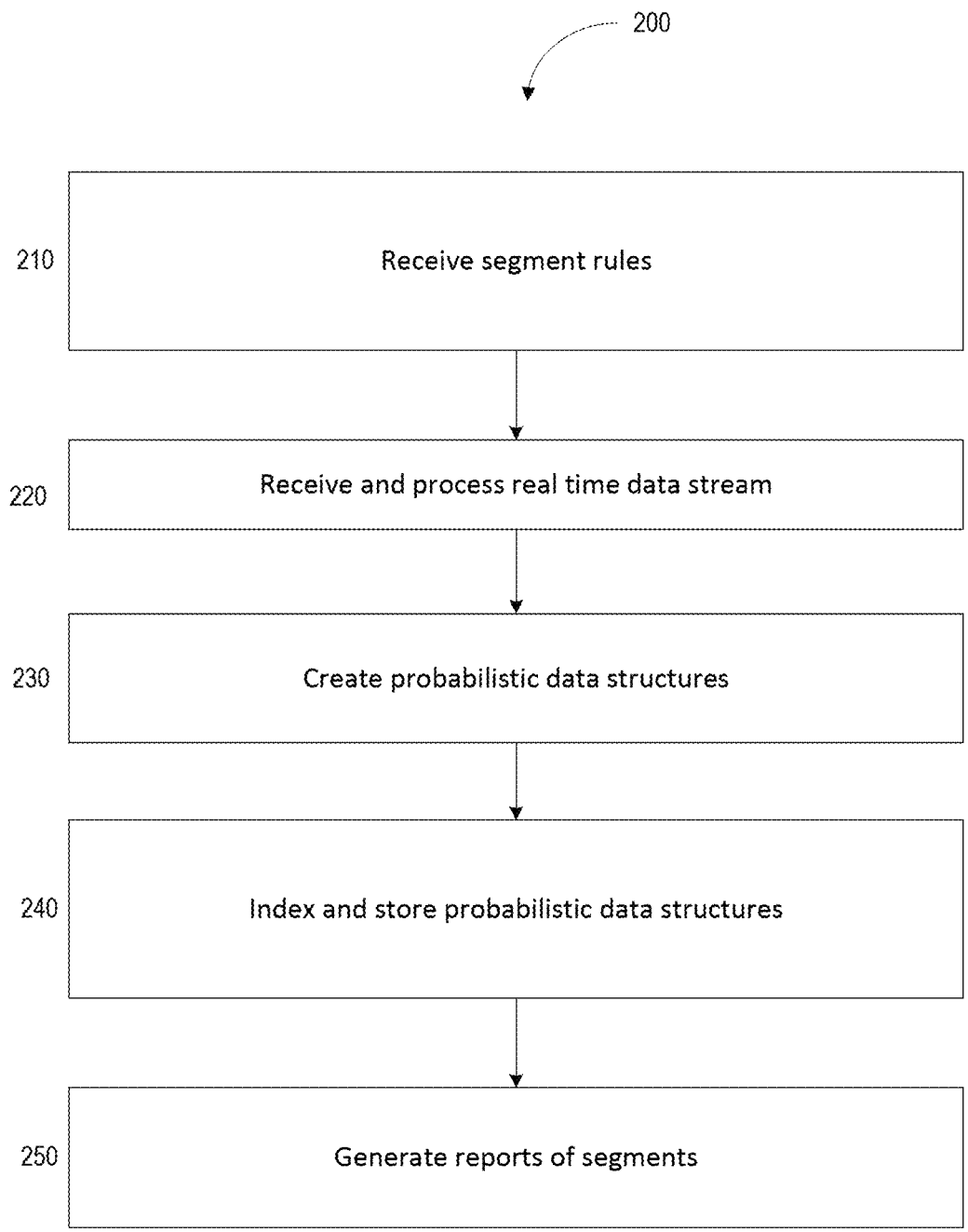
FIG. 2 is a flowchart illustrating an exemplary method for creating, indexing and storing probabilistic data structures representing entity IDs associated with a segment.

FIG. 2 is a flowchart depicting an example process for facilitating segment-specific analytics. The process may be performed by one or more of the components listed in FIG. 1 or by any other suitable components or in any suitable computing and/or communication equipment.

At block 210, segment rules defining characteristics of entities within a segment are received. In one embodiment, a user associated with a tracking entity can input segment rules defining characteristics of entities to the segment definition engine 102 shown in FIG. 1. For example, the segment can be a high level segment, such as, all active users on the website or the segment can be more granular, such as, all female active users on a website that have purchased a particular good within the past 30 days. In one embodiment, the segment rules are received by the segment definition engine 102. Multiple sets of segment rules for multiple segments can be received in parallel. The segment rules for each segment are stored in memory of the computing system 100 and can also be stored in defined segment storage 107.

At step 220, a real time data stream of time stamped data interactions of multiple entities is received and processed to determine the entity IDs matching defined segment rules. As explained above, the data interactions include interactions of an entity, such as a website visitor with a website or a mobile device user with an app. The data stream includes information identifying the entity, such as an entity ID, e.g., user ID or device ID, and the interaction data associated with the entity ID. For example, the interaction data can include that a website visitor is active on the website, that a website visitor is on a specific webpage, that the website visitor clicked on a link, that a website visitor purchased an item, that a device is active on a website, that a user turned on a network connected appliance, that a user interacted with a network connected building, and similar device or user interaction data. The data stream can also include known attributes at time of interaction, such as browser type, product ID, logged in, app version, etc.

In one embodiment the interaction data is augmented with additional data associated with entity IDs. For example, the computing system 100 can identify the entity IDs from the data stream and associate profile information corresponding with the entity IDs to the data stream from the local CRM 111. In such a system, the computing system 100 can, for example, associate the genders of website visitors and past purchasing history of the website visitors with such visitors' user IDs and can associate the operating system of mobile devices with the mobile devices' device IDs.

Using the interaction data and in some embodiments the additional information associated with entity IDs, the computer system 100 determines in real time the entity IDs having associated characteristics that match the segment rules for a segment or segments. In one embodiment, the stream processing engine 104 of the computer system 100 utilizes a Spark Streaming application to determine entity IDs in the data stream with associated characteristics that match the segment rules. The stream processing engine 104 groups the entity IDs by time stamp corresponding to a configured time period.

At step 230, probabilistic data structures containing representations of the entity IDs determined to be in a segment are created over a configured time period. The time period can be any amount of time, such as, for example, one second or one minute. For example, every minute the stream processing engine 104 creates a probabilistic data structure representing entity IDs for the active users to a website during the minute. The stream processing engine 104 can in parallel create probabilistic data structures for multiple segments during a time period. For example, the stream processing engine 104 can create a probabilistic data structure for a segment of active users on a website and in parallel create a probabilistic data structure for a segment of active users who have purchased a good from the website in the past 30 days. The probabilistic data structures are created using probabilistic algorithms such as, HyperLogLog, Bloom filter and Count Min Sketch. For example, the HyperLogLog algorithm can be used to create probabilistic data structures representing unique entity IDs for a particular segment. Count Min Sketch can be used to create probabilistic data structures representing certain dimensional fields, like device operating system or geographical region.

At step 240, the probabilistic data structures are indexed and stored. After a probabilistic data structure is created, the stream processing engine 104 indexes the probabilistic data structure. For example, for each probabilistic data structure the stream processing engine 104 assigns the time period for the probabilistic data structure and the metric or segment the probabilistic data structure is associated with. The indexed probabilistic data structures are stored in memory of the computing system 101 and in probabilistic data storage 105. If multiple data structures are created for a segment during the same time period, such data structures can be combined into a single data structure of the time period prior to indexing and storing. FIG. 3 provides an exemplary index.

Turning to FIG. 3, the exemplary index 300 stores information about each probabilistic data structure so that it can be used by the computing system 100 to analyze the collected data and produce reports. FIG. 3 illustrates that the probabilistic data structures are indexed by the associated time period and segment. In the example index of FIG. 3 the probabilistic data structures 330 are associated with the segment metric 320 for each time period 310. For example, at 340 a probabilistic data structure representing 500 active visitors to a website at minute 1 is indexed. Similarly, at 350 a probabilistic data structure representing 465 active visitors to a website at minute 5 is indexed and at 360 a probabilistic data structure representing 515 active visitors to a website at minute 17 is indexed. Additionally, similar information regarding Visitor Segment S1, which is, for example, entity IDs associated with website visitors who have purchased a product from the website in the past 30 days, is indexed. While FIG. 3 illustrates a count of active visitors and visitor segment S1 in column 330, in one embodiment the actual count number is not stored. Rather, the probabilistic data structure is stored from which the count number is determined. Dimensional sketches of information can also be indexed and stored. For example, index 300 includes a Mobile Device sketch that is a probabilistic data structure representing the types of mobile device operation systems accessing the website at each time period.

Turning back to FIG. 2, at step 250, reports are generated from the indexed probabilistic data structures. In one embodiment, the indexed probabilistic data structures, such as for example shown in FIG. 3, are accessible via an HTTP API. The HTTP API receives a request, queries the appropriate probabilistic data structures, and generates a response for a front end dashboard or other reporting UI. Each probabilistic data structure contains hashed values of entity IDs. By analyzing a probabilistic data structure, the stream processing engine 104 determines the number of unique hashed values and, thus, determines an estimated count of unique entity IDs. Probabilistic data structures can be combined to generate detailed reports. For example, looking at the data shown in index 300 of FIG. 3 probabilistic data structures for the active visitor segment for time periods from 1 minute to 17 minutes can be combined to provide a count of the number of unique visitors to the website during the 17 minute time period. Additionally, the probabilistic data structures can be analyzed together to provide more granular data. For example, looking again at the data shown in index 3 of FIG. 3, the probabilistic data structures for active visitors and the mobile device sketch can be combined to estimate the number of active visitors using a mobile device with the iOS operating system at certain time periods.

Figure 4:
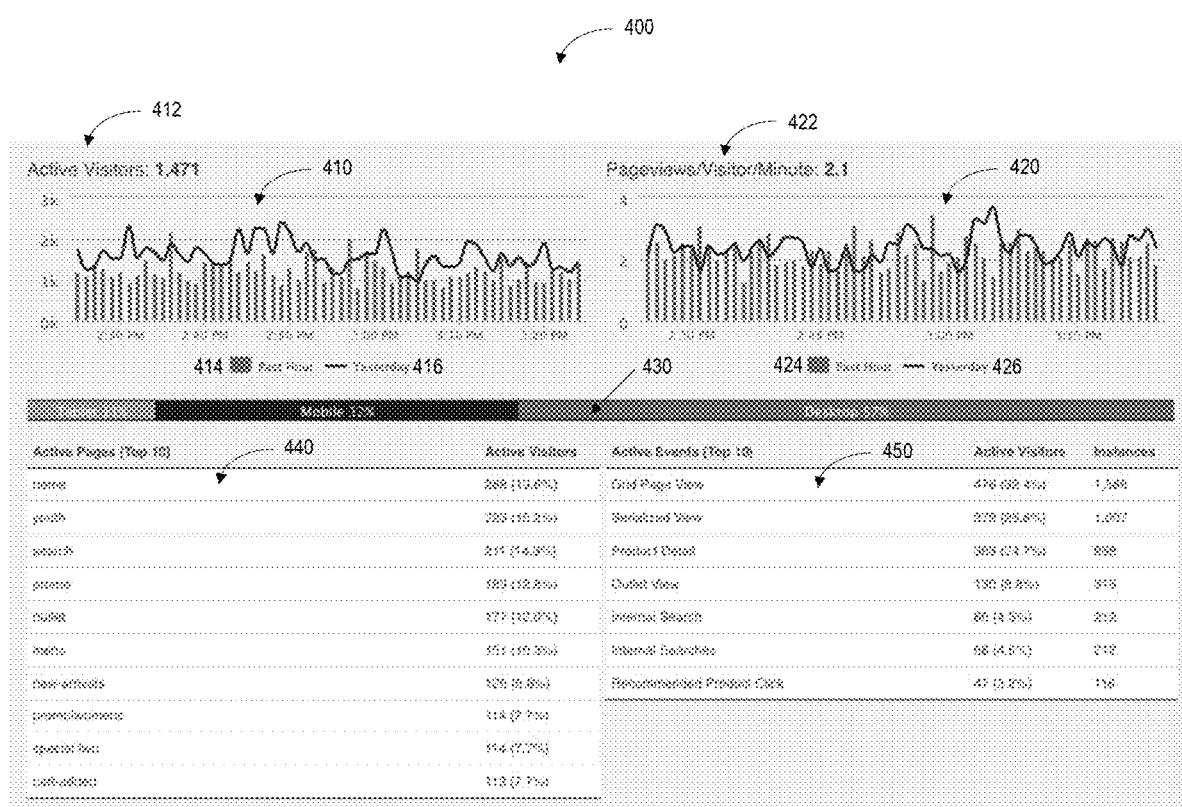
FIG. 4 is a diagram depicting an example of a dashboard displayed for a user for presenting report information on segments.

FIG. 4 illustrates an exemplary dashboard 400 generated by the reporting engine 106 from probabilistic data structures created by the stream processing engine 104. For example, FIG. 4 includes an active visitor graph 410 showing the active visitors on a website for the past hour, i.e., from 2:20 PM to 3:30 PM. The graph includes the average of active visitors for the past two minutes at 412 indicating that the average number of active visitors on the website for the past two minutes is 1,471. The graph 410 shows the count of active visitors for today in minute increments in the bar portion of the graph 414. The graph 410 further shows the count of active visitors from yesterday in the line portion of the graph 416. For example, graph 410 shows that today at 3:10 PM there were approximately 1100 active visitors and yesterday at 3:10 PM there were approximately 1400 active visitors.

The right side of the dashboard 400 contains a page view graph 420 illustrating the average number of web page views by website visitor per minute for the past hour, i.e., from 2:20 PM to 3:30 PM. The graph 420 shows the count of the average number of web pages viewed per visitor for today in minute increments in the bar portion of the graph 424. The graph 420 further shows the count of the average number of web pages viewed per visitor from yesterday in the line portion of the graph 426. For example, graph 420 shows that today at 3:00 PM the average number of web page views per visitor was just under 2 and yesterday at 3:00 PM the average number of web page views per visitor was just over 2. The dashboard 400 also shows the average number of webpage views per visitor per minute for the past two minutes at 422.

Additionally, dashboard 400 displays the percentage of computing device types used to access the website for the time period shown, i.e., 2:20 PM to 3:30 PM, in the device type bar 430. The bar shows that during the current hour 11% of the computing devices were tablets, 32% of the computing devices were mobile devices, and 57% of the computing devices were desktop devices.

Further, the dashboard 400 includes an active pages chart 440 illustrating the web pages viewed by the active visitors over a specified time period, such as two minutes. In this example, the HOME page was viewed by 288 active visitors or 19.6% of all active visitors during the past two minutes. The dashboard 400 also includes an active events chart 450 illustrating the events selected by the active visitors over a specified time period, such as two minutes. In this example, the Grid Page View Serialized was selected by 476 active visitors or 32.4% of active visitors during the past two minutes.

Additionally, the dashboard 400 can also include information about the language of the website shown to active visitors and a day of the week chart illustrating the number and percentage of active users accessing the website on a weekday or weekend.

The dashboard 400 is exemplary and is intended to illustrate the type of information that can be determined by the stream processing engine 104 and is not meant to be limiting. For example, additional and different information can be displayed in a dashboard. Moreover, the time periods for the information displayed in the dashboards can also vary.

Figure 5:
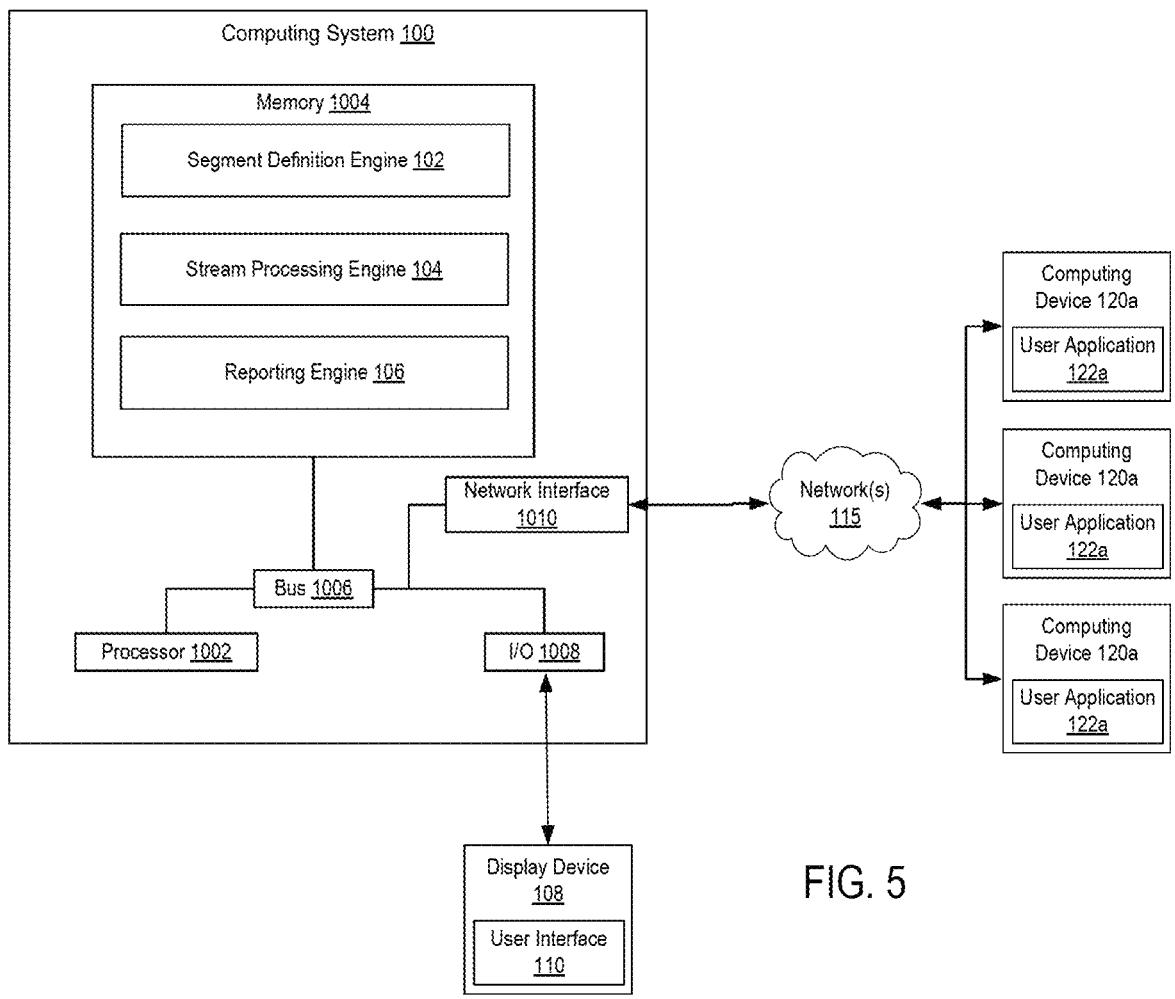
FIG. 5 is a block diagram depicting example hardware implementations for the components described in FIG. 1.

Any suitable computing system or group of computing systems can be used to implement the computing system 100 and computing devices 120*a-c*. For example, FIG. 5 is a block diagram depicting examples of implementations of such components. The computing system 100 can include a processor 1002 that is communicatively coupled to a memory 1004 and that executes computer-executable program code and/or accesses information stored in the memory 1004. The processor 1002 may comprise a microprocessor, an application-specific integrated circuit ("ASIC"), a state machine, or other processing device. The processor 1002 can include one processing device or more than one processing device. Such a processor can include or may be in communication with a computer-readable medium storing instructions that, when executed by the processor 1002, cause the processor to perform the operations described herein.

The memory 1004 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C #, Visual Basic, Java, Python, Perl, JavaScript, and ActionScript.

The computing system 100 may also comprise a number of external or internal devices such as input or output devices. For example, the computing system 100 is shown with an input/output ("I/O") interface 1008 that can receive input from input devices or provide output to output devices. Display device 108, for example, can be communicatively coupled to I/O interface 1008. A bus 1006 can also be included in the computing system 100. The bus 1006 can communicatively couple one or more components of the computing system 100. I/O interface 1008 can also be receive input from and provide output to persistent storage devices, such as probabilistic data storage 105, defined segment storage 107, and local CRM 111 show in FIG. 1.

The computing system 100 can execute program code that configures the processor 1002 to perform one or more of the operations described above. The program code can include one or more of the segment definition engine 102, stream processing engine 104, or reporting engine 106. The program code may be resident in the memory 1004 or any suitable computer-readable medium and may be executed by the processor 1002 or any other suitable processor. In some embodiments, the modules can be resident in the memory 1004, as depicted in FIG. 5. In additional or alternative embodiments, one or more modules can be resident in a memory that is accessible via a data network, such as a memory accessible to a cloud service.

The computing system 100 can also include at least one network interface device 1010. The network interface device 1010 can include any device or group of devices suitable for establishing a wired or wireless data connection to one or more data networks 115. Non-limiting examples of the network interface device 1010 include an Ethernet network adapter, a modem, and/or the like. The computing system 100 can transmit messages as electronic or optical signals via the network interface device 1010.

The computing devices 120*a-c* can similarly each include a processor that is communicatively coupled to a memory and that executes computer-executable program code and/or accesses information stored in the memory and otherwise include similar computing components as described with respect to computing system 100.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. In an environment in which a real time data stream of data interactions by multiple entities is tracked, a method for compactly storing representations of segment-specific interaction data to facilitate segment-specific analytics for particular time periods, the method comprising:
receiving segment rules defining characteristics of entities within a segment;
accessing a real time data stream comprising instances of interaction data and associated entity identifiers;
creating a probabilistic data structure for the segment and for a time period by at least:
identifying entity identifiers from instances of interaction data during the time period in the real time data stream that match the segment rules; and
providing the identified entity identifiers to a function to randomize the identified entity identifiers to generate elements of the probabilistic data structure, wherein an estimate of a number of unique entity identifiers can be determined from the probabilistic data structure with an associated probability; and
indexing and storing the probabilistic data structure, wherein the indexing allows the unique entity identifiers in the probabilistic data structure to be counted and compared to facilitate segment-specific analytics for particular time periods.

2. The method of claim 1, the method further comprising:
creating an additional probabilistic data structure representing additional unique entity identifiers included in instances of interaction data in the real time data stream during an additional time period different from the time period.

3. The method of claim 1, further comprising:
receiving additional segment rules defining characteristics of entities within an additional segment that is different than the segment;
creating an additional probabilistic data structure representing unique entity identifiers included in instances of interaction data in the real time data stream during the time period, the additional probabilistic data structure representing only entity identifiers of the entities within the additional segment; and
indexing and storing the additional probabilistic data structure with the probabilistic data structure, wherein the indexing allows unique entity identifiers in the additional probabilistic data structure to be counted and compared to facilitate the segment-specific analytics for the particular time periods.

4. The method of claim 1, wherein the unique entity identifiers are user identifiers.

5. The method of claim 1, wherein the unique entity identifiers are device identifiers.

6. The method of claim 1, wherein the probabilistic data structure is created based on a probabilistic algorithm, wherein the probabilistic algorithm is at least one of a HyperLogLog, Bloom filter, or a Count-Min sketch.

7. The method of claim 1, further comprising creating, indexing and storing multiple probabilistic data structures associated with multiple time periods.

8. The method of claim 1, further comprising generating a report for display providing a number of entity identifiers of entities within the segment during the time period, wherein the report is generated using an HTTP streaming API.

9. The method of claim 1, wherein the function comprises a hashing function for generating hashes for the identified entity identifiers.

10. The method of claim 9, wherein the estimate of the number of unique entity identifiers is determined based on a number of unique hashes.

11. In an environment in which a computer receives a real-time data stream, a method for determining a segment count from the real-time data stream, the method comprising:
receiving segment rules defining characteristics of entities within a segment;
accessing a real time data stream comprising instances of interaction data and associated entity identifiers;
creating a probabilistic data structure for the segment and for a time period by:
identifying entity identifiers from instances of interaction data during the time period in the real time data stream that match the segment rules; and
providing the identified entity identifiers to a function to randomize the identified entity identifiers to generate elements of the probabilistic data structure, wherein an estimate of a number of unique entity identifiers can be determined from the probabilistic data structure with an associated probability;
indexing the probabilistic data structure; and
determining, from the probabilistic data structure, a segment count comprising an estimated size of the segment, wherein the segment count facilitates segment-specific analytics for particular time periods.

12. The method according to claim 11, further comprising:
creating an additional probabilistic data structure representing entity identifiers for the segment and an additional segment for multiple time periods; and
indexing and storing the additional probabilistic data structure.

13. The method of claim 11, wherein the unique entity identifiers are user identifiers.

14. The method of claim 11, wherein the unique entity identifiers are device identifiers.

15. The method of claim 11, wherein the probabilistic data structure is created using a probabilistic algorithm that is at least one of a HyperLogLog, Bloom filter and a Count-Min.

16. The method of claim 11, further comprising generating a report for display providing a number of entity identifiers of entities within the segment during the time period, wherein the report is generated using an HTTP streaming API.

17. In an environment in which a real time data stream of data interactions by multiple entities is tracked, a system for compactly storing representations of segment-specific interaction data to facilitate segment-specific analytics for particular time periods, the system comprising:
a processing device;
a memory device communicatively coupled to the processing device, wherein the processing device is configured to execute instructions stored in the memory device and thereby perform operation comprising:
receiving segment rules defining characteristics of entities within a segment;
accessing a real time data stream comprising instances of interaction data and associated entity identifiers;
creating a probabilistic data structure for the segment and for a time period by:
identifying entity identifiers from instances of interaction data during the time period in the real time data stream that match the segment rules, and
providing the identified entity identifiers to a function to randomize the identified entity identifiers to generate elements of the probabilistic data structure, wherein an estimate of a number of unique entity identifiers can be determined from the probabilistic data structure with an associated probability; and
indexing and storing the probabilistic data structure, wherein the indexing allows the unique entity identifiers in the probabilistic data structure to be counted and compared to facilitate segment-specific analytics for particular time periods.

18. The system of claim 17, wherein the processing device is configured to execute instructions stored in the memory device to perform operations further comprising:
creating a second probabilistic data structure representing unique entity identifiers included in instances of interaction data in the real time data stream during a second time period different from the time period, the second probabilistic data structure representing only entity IDs of entities within the segment; and
determining a first number of unique entity identifiers from the probabilistic data structure and determining a second number of unique entity identifiers from the second probabilistic data structure.

19. The system of claim 17, wherein the probabilistic data structure is created using a probabilistic algorithm.

20. The system of claim 17, wherein the processing device is configured to execute instructions stored in the memory device to perform operations further comprising generating a report for display providing a first number of entity identifiers of entities within the segment during the time period, wherein the report is generated using an HTTP streaming API.

* * * * *